United States Patent
Hong et al.

(10) Patent No.: US 11,515,521 B2
(45) Date of Patent: Nov. 29, 2022

(54) POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

(71) Applicant: SAMSUNG SDI CO., LTD., Yongin-si (KR)

(72) Inventors: Mingzi Hong, Yongin-si (KR); Young-Ki Kim, Yongin-si (KR); Jungjoon Park, Yongin-si (KR); Soonrewl Lee, Yongin-si (KR); Youngjoo Chae, Yongin-si (KR); Ickkyu Choi, Yongin-si (KR); Soonkie Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 259 days.

(21) Appl. No.: 16/670,739

(22) Filed: Oct. 31, 2019

(65) Prior Publication Data

US 2020/0144602 A1 May 7, 2020

(30) Foreign Application Priority Data

Nov. 2, 2018 (KR) .................. 10-2018-0133746

(51) Int. Cl.
*H01B 1/08* (2006.01)
*H01M 4/36* (2006.01)
(Continued)

(52) U.S. Cl.
CPC .............. *H01M 4/364* (2013.01); *H01B 1/08* (2013.01); *H01M 4/505* (2013.01); *H01M 4/525* (2013.01);
(Continued)

(58) Field of Classification Search
CPC ........ H01B 1/08; H01M 4/364; H01M 4/505; H01M 4/525; H01M 10/0525
See application file for complete search history.

(56) References Cited

U.S. PATENT DOCUMENTS

2011/0250499 A1  10/2011  Hiratsuka
2013/0183579 A1*  7/2013  Kim ................... H01M 4/5825
                                                    429/231.95
(Continued)

FOREIGN PATENT DOCUMENTS

CN      102203988 A      9/2011
CN      103456933 A     12/2013
(Continued)

OTHER PUBLICATIONS

Japanese Office action dated Jul. 5, 2021, issued in corresponding Japanese Patent Application No. 2019-199977, 7 pages, (No English language translation provided).

(Continued)

*Primary Examiner* — Mark Kopec
(74) *Attorney, Agent, or Firm* — Lewis Roca Rothgerber Christie LLP

(57) ABSTRACT

A positive active material for a rechargeable lithium battery includes a first compound represented by Chemical Formula 1, and a second compound represented by Chemical Formula 2 and having a smaller particle diameter than the first compound, wherein at least one of the first compound and the second compound includes a core and a surface layer surrounding the core:

$Li_{a1}Ni_{x1}Co_{y1}M^1{}_{1-x1-y1}O_2$,    Chemical Formula 1

$Li_{a2}Ni_{x2}Co_{y2}M^2{}_{1-x2-y2}O_2$,    Chemical Formula 2 wherein $M^1$ and $M^2$ are each independently at least one selected from Mn, Al, Cr, Fe, V, Mg, Ti, Zr, Nb, Mo, W, Cu, (Continued)

Zn, Ga, In, Sn, La, and Ce. The atomic concentration (at %) of nickel (Ni) with respect to the total amount of non-lithium metals is higher in the surface layer than in the core, and an amount of cation mixing is less than or equal to about 3%.

16 Claims, 5 Drawing Sheets

(51) Int. Cl.
*H01M 4/505* (2010.01)
*H01M 4/525* (2010.01)
*H01M 10/0525* (2010.01)
*H01M 4/02* (2006.01)

(52) U.S. Cl.
CPC .. *H01M 10/0525* (2013.01); *H01M 2004/028* (2013.01)

(56) References Cited

U.S. PATENT DOCUMENTS

| | | |
|---|---|---|
| 2013/0323598 A1 | 12/2013 | Liu et al. |
| 2014/0158932 A1 | 6/2014 | Sun et al. |
| 2014/0212749 A1 | 7/2014 | Choi et al. |
| 2015/0010819 A1 | 1/2015 | Lee et al. |
| 2015/0056511 A1 | 2/2015 | Takamatsu et al. |
| 2015/0340686 A1 | 11/2015 | Sun et al. |
| 2016/0006031 A1 | 1/2016 | Kaseda et al. |
| 2017/0077513 A1 | 3/2017 | Han et al. |
| 2020/0411859 A1* | 12/2020 | Kim ................. C01G 53/00 |
| 2021/0005877 A1* | 1/2021 | Kim ................. C01G 53/42 |

FOREIGN PATENT DOCUMENTS

| | | |
|---|---|---|
| CN | 104282903 A | 1/2015 |
| CN | 104396061 A | 3/2015 |
| CN | 105009333 A | 10/2015 |
| JP | 2015-18803 A | 1/2015 |
| JP | 2017-154915 A | 9/2017 |
| KR | 10-2011-0132287 A | 12/2011 |
| KR | 10-2013-0105494 A | 9/2013 |
| KR | 10-2015-0006283 A | 1/2015 |
| KR | 10-2016-0049519 A | 5/2016 |
| KR | 10-2017-0030796 A | 3/2017 |
| WO | WO 2010/029745 A1 | 3/2010 |
| WO | WO 2010/113512 A1 | 10/2010 |
| WO | 2013/191179 A1 | 12/2013 |
| WO | 2014/142281 A1 | 9/2014 |
| WO | WO 2014/133064 A1 | 9/2014 |

OTHER PUBLICATIONS

Japanese Office Action dated Oct. 26, 2020, for corresponding Japanese Patent Application No. 2019-199977 (7 pages), (No English language translation provided).
Extended European Search Report for corresponding European Patent Application No. 19206386.5, dated Mar. 19, 2020, 7 pages.
Korean Intellectual Property Office Action for corresponding Korean Patent Application No. 10-2018-0133746, dated Feb. 19, 2020, 7 pages, (No English trans. provided).
Liu, Shuang, et al., Long cycle life lithium ion battery with lithium nickel cobalt manganese oxide (NCM) cathode, Journal of Power Sources, vol. 261, dated Mar. 24, 2014, pp. 285-291.
European Patent Office Action, issued in corresponding Patent Application No. 19206386.5, dated May 25, 2022, 6 Pages.
Chinese Office Action dated Aug. 26, 2022, and Search Report dated Aug. 17, 2022, of the corresponding Chinese Application No. 201911058362.5, with corresponding English translation, 23 pages.

\* cited by examiner

POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

CROSS-REFERENCE TO RELATED APPLICATION

This application claims priority to and the benefit of Korean Patent Application No. 10-2018-0133746 filed in the Korean Intellectual Property Office on Nov. 2, 2018, the entire content of which is incorporated herein by reference.

BACKGROUND

1. Field

One or more aspects of example embodiments of the present disclosure are related to a positive active material for a rechargeable lithium battery, a method of preparing the same, and a rechargeable lithium battery including the same.

2. Description of the Related Art

Down-sizing and weight reduction of high energy density rechargeable lithium batteries have become increasingly important in terms of meeting the small size and high performance requirements of various electronic devices. In addition, high capacity and high temperature stability of rechargeable lithium batteries, and stability at a high voltage are of increasing importance for electric vehicle applications and the like.

Various positive active materials have been investigated for use in rechargeable lithium batteries.

Nickel (Ni)-based lithium transition metal oxides including a combination of Ni, cobalt (Co), and manganese (Mn) generally provide higher discharge capacities per unit weight compared to $LiCoO_2$, but have lower capacity per unit volume due to their low material density, and exhibit low discharge capacity in a rechargeable lithium battery. In addition, rechargeable lithium batteries including a nickel-based lithium transition metal oxide may have deteriorated safety during operation at high voltage.

In particular, when the atomic concentration of Ni is 33 at % to about 60 at % with respect to the total metals excluding lithium, the charge and discharge efficiency of the rechargeable battery employing it may be less than or equal to about 90%, cation mixing may be about 5%, and the molar ratio of Li/transition metal may be 1.01 to 1.05. Theoretically, the ideal (stoichiometric) ratio of Li/transition metal should be 1.00. However, since synthesis methods of Ni-based positive active material in the related art use an excess amount of Li relative to the transition metal, the charge and discharge efficiency of a rechargeable lithium battery employing the same may be deteriorated, and cation mixing may be increased.

Therefore, there is a desire for a positive active material having an ideal layered structure with decreased cation mixing, and a high efficiency rechargeable lithium battery employing the same.

SUMMARY

One or more aspects of embodiments of the present disclosure are directed toward a positive active material for a rechargeable lithium battery having improved charge and discharge capacity, charge and discharge efficiency, and/or cycle-life.

One or more aspects of embodiments of the present disclosure are directed toward a method of preparing the positive active material.

One or more aspects of embodiments of the present disclosure are directed toward a rechargeable lithium battery including the positive active material.

One or more example embodiments of the present disclosure provide a positive active material for a rechargeable lithium battery including a first compound represented by Chemical Formula 1, and a second compound represented by Chemical Formula 2 and having a smaller particle diameter than the first compound, wherein at least one of the first compound and the second compound includes a core and a surface layer surrounding the core. An atomic concentration (at %) of nickel (Ni) with respect to the total amount of non-lithium metals in the surface layer is higher than an atomic concentration (at %) of Ni with respect to the total amount of non-lithium metals in the core, and a cation mixing is less than or equal to about 3%.

$$Li_{a1}Ni_{x1}Co_{y1}M^1_{1-x1-y1}O_2. \quad\text{Chemical Formula 1}$$

In Chemical Formula 1, 0.9≤a1≤1.05, 0.3≤x1≤0.95, 0.1≤y1≤0.3, and $M^1$ is at least one metal element selected from manganese (Mn), aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

$$Li_{a2}Ni_{x2}Co_{y2}M^2_{1-x2-y2}O_2. \quad\text{Chemical Formula 2}$$

In Chemical Formula 2, 0.9≤a2≤1.05, 0.3≤x2≤0.95, 0.1≤y2≤0.3, and $M^2$ is at least one metal element selected from Mn, Al, Cr, Fe, V, Mg, Ti, Zr, Nb, Mo, W, Cu, Zn, Ga, In, Sn, La, and Ce.

The positive active material may have an atomic concentration (at %) of nickel (Ni) with respect to the total amount of non-lithium metals of about 30 at % to about 60 at %.

A ratio of the atomic concentration (at %) of nickel (Ni) with respect to the total amount of non-lithium metals in the surface layer relative to the atomic concentration (at %) of nickel (Ni) with respect to the total amount of non-lithium metals in the core may be about 1.03 to about 1.20.

The first compound may have an average particle diameter (D50) of about 15 μm to about 20 μm.

The second compound may have an average particle diameter (D50) of about 2 μm to about 5 μm.

The first compound and the second compound may be mixed in a weight ratio of about 90:10 to about 50:50.

The second compound may have a needle-shape, a sheet-shape, or a combination thereof.

The surface layer may be a region corresponding to a depth of about 200 nm from the surface of the first compound or the second compound.

One or more example embodiments of the present disclosure provide a method of preparing a positive active material, which includes mixing a compound 1A represented by Chemical Formula 1A, a compound 2A represented by Chemical Formula 2A having a smaller particle diameter than the compound 1A, and a lithium salt to prepare a mixture; first heat-treating the mixture under a rapid temperature-increasing condition to prepare a first fired product including residual lithium; and second heat-treating the first fired product to prepare the positive active material.

$$Ni_{x1}Co_{y1}M^1_{1-x1-y1}(OH)_2. \quad\text{Chemical Formula 1A}$$

In Chemical Formula 1A, 0.3≤x1≤0.95, 0.1≤y1≤0.3, and M¹ is at least one metal element selected from Mn, Al, Cr, Fe, V, Mg, Ti, Zr, Nb, Mo, W, Cu, Zn, Ga, In, Sn, La, and Ce.

$$Ni_{x2}Co_{y2}M^2{}_{1-x2-y2}(OH)_2.$$ Chemical Formula 2A

In Chemical Formula 2A, 0.3≤x2≤0.95, 0.1≤y2≤0.3, and M² is at least one metal element selected from Mn, Al, Cr, Fe, V, Mg, Ti, Zr, Nb, Mo, W, Cu, Zn, Ga, In, Sn, La, and Ce.

The compound 1A and the compound 2A may be mixed in a weight ratio of about 90:10 to about 50:50.

In the mixture, a mole ratio of Li/(Ni+Co+Mn) may be greater than or equal to about 0.99.

The rapid temperature-increasing condition may include increasing a temperature at about 4° C./m in to about 6° C./min.

The first heat-treating may include a process of maintaining the mixture in an air atmosphere or an oxidizing gas atmosphere at about 800° C. to about 1000° C. for about 1 hour to about 4 hours.

The compound 2A may have a needle-shape, a sheet-shape, or a combination thereof.

One or more example embodiments of the present disclosure provide a rechargeable lithium battery including a positive electrode including the positive active material; a negative electrode including a negative active material; and an electrolyte with the positive electrode and the negative electrode.

The cation mixing of the positive active material may be reduced, and thus a rechargeable battery with improved charge and discharge efficiency may be provided.

Residual lithium on the surface of the positive active material and gas generation may be reduced, and thus a positive active material for a rechargeable lithium battery having improved phase stability and cycle-life characteristics and a rechargeable lithium battery including the same may be achieved.

DETAILED DESCRIPTION

Figure 1:
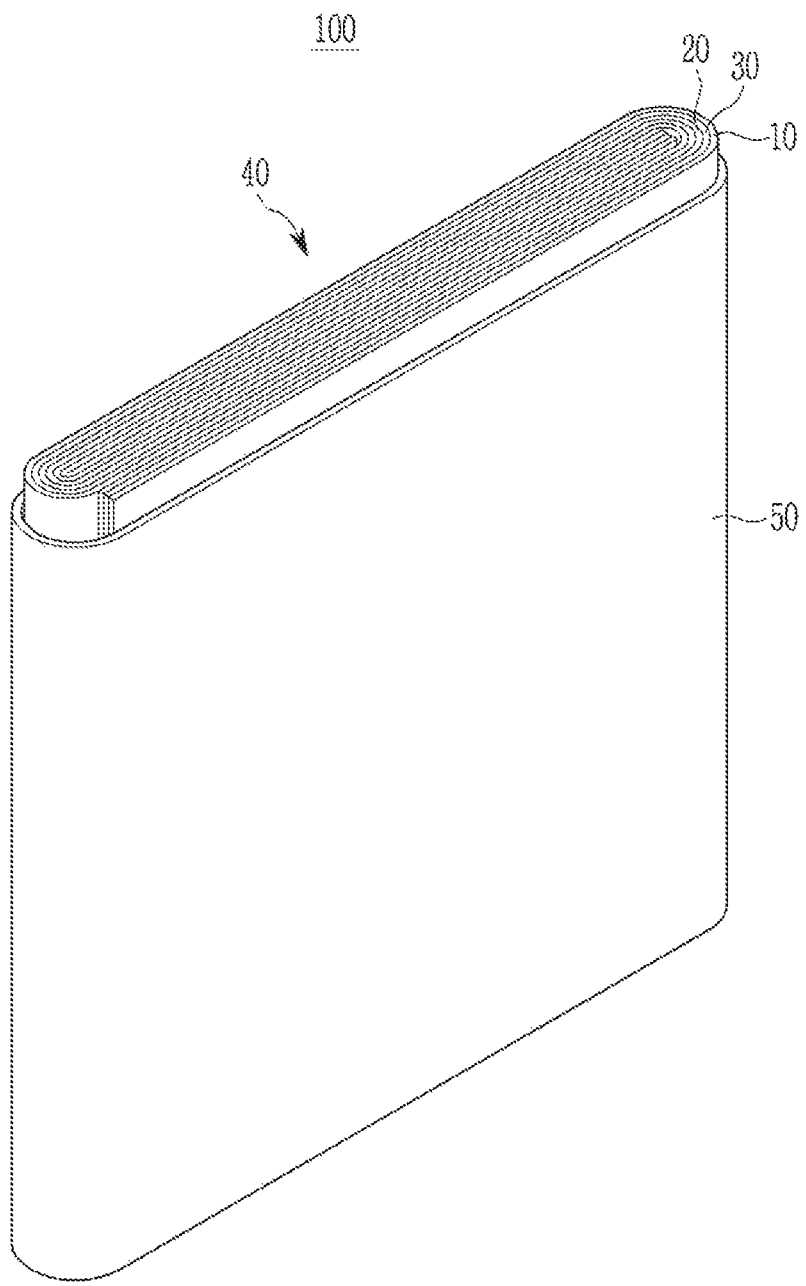
FIG. 1 is a schematic view illustrating a structure of a rechargeable lithium battery according to an embodiment of the present disclosure.

Hereinafter, embodiments of the present invention are described in more detail. However, these embodiments are exemplary, the present invention is not limited thereto, and the present invention is defined by the scope of claims.

In the drawings, the thicknesses of layers, films, panels, regions, etc., may be exaggerated for clarity. Like reference numerals designate like elements throughout the specification, and duplicative descriptions thereof may not be provided. It will be understood that when an element such as a layer, film, region, or substrate is referred to as being "on" another element, it can be directly on the other element or intervening elements may also be present. In contrast, when an element is referred to as being "directly on" another element, no intervening elements are present. Further, the use of "may" when describing embodiments of the present disclosure refers to "one or more embodiments of the present disclosure."

One or more example embodiments of the present disclosure provide a positive active material for a rechargeable lithium battery including a first compound represented by Chemical Formula 1, and a second compound represented by Chemical Formula 2 and having a smaller particle diameter than the first compound, wherein at least one of the first compound and the second compound includes a core and a surface layer surrounding the core. An atomic concentration (at %) of nickel (Ni) with respect to the total amount of non-lithium metals in the surface layer is higher than a Ni atomic concentration (at %) of nickel (Ni) with respect to the total amount of non-lithium metals in the core, and cation mixing is less than or equal to about 3%.

$$Li_{a1}Ni_{x1}Co_{y1}M^1{}_{1-x1-y1}O_2.$$ Chemical Formula 1

In Chemical Formula 1, 0.9≤a1≤1.05, 0.3≤x1≤0.95, 0.1≤y1≤0.3, and M¹ is at least one metal element selected from manganese (Mn), aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

$$Li_{a2}Ni_{x2}Co_{y2}M^2{}_{1-x2-y2}O_2.$$ Chemical Formula 2

In Chemical Formula 2, 0.9≤a2≤1.05, 0.3≤x2≤0.95, y2≤0.3, and M² is at least one metal element selected from Mn, Al, Cr, Fe, V, Mg, Ti, Zr, Nb, Mo, W, Cu, Zn, Ga, In, Sn, La, and Ce.

In Chemical Formulae 1 and 2, x1 and x2 indicate an atomic concentration (at %) of Ni with respect to the metals except Li (e.g., with respect to the total amount of non-lithium metals). x1 of the first compound and x2 of the second compound may each independently be about 0.30 to about 0.95, for example about 0.30 to about 0.80, about 0.30 to about 0.70, about 0.30 to about 0.60, about 0.50 to about 0.60, or about 0.53 to about 0.57. In some embodiments, the Ni atom concentration may be about 30 at % to about 95 at %, for example, about 30 at % to about 80 at %, about 30 at % to about 70 at %, about 30 at % to about 60 at %, about 50 at % to about 60 at %, or about 53 at % to about 57 at % based on 100 at % of the total amount of non-lithium metals of the positive active material. Accordingly, a battery having improved charge and discharge capacity, efficiency, and/or cycle-life characteristics may be provided.

An example commercially available high nickel NCM-based positive active material in the related art has an initial charge and discharge efficiency of less than about 90%. In comparison, the positive active material according to an embodiment of the present disclosure may have an initial charge and discharge efficiency of greater than or equal to about 92%, and the production cost may be decreased by virtue of the reduced Co amount.

In addition, in some embodiments, an atomic concentration ratio of Mn relative to Ni (Mn/Ni) may be about 0.36 to about 0.55, and an atomic concentration ratio of Mn relative to Co (Mn/Co) may be about 0.8 to about 2.0.

The second compound may have a smaller average particle diameter (D50) than the first compound. The first compound may have, for example, an average particle diameter of greater than or equal to about 15 µm, greater than or equal to about 16 µm, or greater than or equal to about 17 µm; and less than or equal to about 20 µm, less than or equal to about 19 µm, or less than or equal to about 18 µm. The second compound may have an average particle diameter of greater than or equal to about 2 µm, or greater than or equal to about 3 µm; and less than or equal to about 5 µm, or less than or equal to about 4 µm. The difference between the average particle diameters of the first compound and the second compound may be greater than or equal to about 10 µm, greater than or equal to about 11 µm, or greater than or equal to about 12 µm; and less than or equal to about 18 µm, less than or equal to about 17 µm, or less than or equal to about 16 µm.

When the average particle diameters of the first compound and the second compound are in the above-described ranges, a battery having improved electrode density and high rate capability may be obtained.

According to an embodiment of the present disclosure, a bimodal type positive active material including the first compound and the second compound having different average particle diameters may be obtained. This bimodal type positive active material may allow for improved electrode density, and thereby a high-capacity battery.

In some embodiments, the first compound and the second compound may have a structure in which a secondary particle includes an assembled plurality of primary particles.

As used herein, the term "average particle diameter" may refer to an average particle diameter of a plurality of secondary particles. Further, the average particle diameter may be measured using any suitable particle diameter analyzer, and may refer to the particle diameter of a particle at the midpoint (50 volume %) in a cumulative distribution curve of particle size.

At least one of the first compound and the second compound includes a core and a surface layer surrounding (e.g., on) the core. The surface layer may be a region within a depth of about 200 nm, about 190 nm, or about 180 nm from a surface of the first compound secondary particle and/or the second compound secondary particle, and the core may be the remaining region not included in the surface layer, for example, a region greater than about 200 nm, greater than about 190 nm, or greater than about 180 nm from the surface of the secondary particle to the inner center of the secondary particle.

An atomic concentration (at %) of Ni (e.g., with respect to the total metals excluding lithium) in the surface layer may be higher than an atomic concentration (at %) of Ni (e.g., with respect to the total metals excluding lithium) in the core. The positive active material may be produced using two heat treatment processes. Residual lithium on a secondary particle surface of the first compound and/or the second compound after the first heat treatment process may react with a transition metal hydroxide during the second heat-treatment under an oxygen atmosphere. As such, a Ni atom concentration (at %) of the final product positive active material may be increased at the surface layer. For example, because the positive active material according to an embodiment of the present disclosure has a higher Ni atom concentration in the surface layer (depth of about 200 nm) than in the core, and lithium ions may be substantially reversibly intercalated/deintercalated in the surface layer, the charge and discharge capacity, efficiency, and/or cycle-life characteristics of the rechargeable battery may be improved.

A ratio of the Ni atom concentration with respect to the total metals excluding lithium in the surface layer relative to the Ni atom concentration with respect to the total metals excluding lithium in the core may be about 1.03 to about 1.20, for example, about 1.03 to about 1.15, or about 1.05 to about 1.13. In this case, a battery having an improved electrode density and/or high rate capability may be obtained.

The positive active material may have a cation mixing of less than or equal to about 3%, for example less than or equal to about 2.9%, less than or equal to about 2.8%, less than or equal to about 2.7%, less than or equal to about 2.6%, less than or equal to about 2.5%, or less than or equal to about 2.4%.

As used herein, "cation mixing" refers to a phenomenon in which $Li^+$ (0.76 Å) and $Ni^{2+}$ (0.69 Å) atoms, having similar ion radii, exchange their sites (e.g., substitute each other's sites) within the crystal. For example, because nickel tends to prefer a divalent valence rather than a trivalent valence (e.g., divalent nickel is more stable than trivalent nickel), a divalent nickel ion ($Ni^{2+}$) having a similar ion radius to lithium ion may be mixed (e.g., substitute or diffuse) into vacant positions of the lithium layer, the formation of which may be due to volatilizing a raw material of lithium salt during high temperature firing. As a result, the lithium nickel oxide may have a non-stoichiometric composition (e.g., with respect to lithium content). In addition, nickel ion ($Ni^{2+}$) mixed into the lithium layer may interrupt or hinder diffusion of lithium ions, and may also greatly increase irreversibility of the oxidation-reduction reactions of the battery, such that the capacity of the rechargeable battery may be deteriorated. Embodiments of the present disclosure may reduce such cation mixing by utilizing a rapid temperature-increase in the first heat-treatment and a shortened maintaining time of the first heat-treatment during production of a positive active material. When the cation mixing is within the above-described ranges, the effect on battery performance may be minimized or reduced. Although the amount of cation mixing may be reduced by performing the first heat-treatment in a short time and at a high temperature during producing the positive active material, a large amount of unreacted residual lithium may be unfavorably created under such conditions. However, the unreacted residual lithium may be removed by using as a lithium source configured to react with a hydroxide precursor in the second heat-treatment, which will be described in more detail below.

As used herein, the percentage (%) of cation mixing refers to a ratio (%) of a portion of nickel ion ($Ni^{2+}$) mixed to (e.g., present in or substituting) a Li site, which may be calculated via X-ray diffraction (XRD) analysis.

The first compound and the second compound may be mixed at a weight ratio of about 90:10 to about 50:50, for example, about 80:20 to about 70:30. When the mixing ratio of the first compound and the second compound is within this range, a mixture density of the positive active material may be increased, and swelling caused by gas generation under high voltage and high temperature conditions may be suppressed, so that the obtained battery may have excellent volumetric capacity.

The second compound may have a needle-shape, a sheet-shape, or a combination thereof. When it has the above shape, a mixture density of the positive active material may be increased and charge and discharge capacity and efficiency characteristics of a battery may be improved.

One or more example embodiments of the present disclosure provide a method of preparing the positive active material.

Hereinafter, a method of preparing the positive active material is explained in more detail, according to embodiments of the present disclosure.

A method of preparing a positive active material according to an embodiment of the present disclosure includes mixing a compound 1A represented by Chemical Formula 1A, a compound 2A represented by Chemical Formula 2A having a smaller particle diameter than the compound 1A, and a lithium salt to prepare a mixture; first heat-treating the mixture under a rapid temperature-increasing condition to prepare a first fired product including unreacted residual lithium; and second heat-treating the first fired product.

$$Ni_{x1}Co_{y1}M^1_{1-x1-y1}(OH)_2. \quad \text{Chemical Formula 1A}$$

In Chemical Formula 1A,
$0.3 \leq x1 \leq 0.95$, $0.1 \leq y1 \leq 0.3$, and $M^1$ is at least one metal element selected from Mn, Al, Cr, Fe, V, Mg, Ti, Zr, Nb, Mo, W, Cu, Zn, Ga, In, Sn, La, and Ce.

$$Ni_{x2}Co_{y2}M^2_{1-x2-y2}(OH)_2. \quad \text{Chemical Formula 2A}$$

In Chemical Formula 2A,
$0.3 \leq x2 \leq 0.95$, $0.1 \leq y2 \leq 0.3$, and $M^2$ is at least one metal element selected from Mn, Al, Cr, Fe, V, Mg, Ti, Zr, Nb, Mo, W, Cu, Zn, Ga, In, Sn, La, and Ce.

The lithium salt and the compound 1A and the compound 2A may be mixed to generate a mole ratio Li/(Ni+Co+Mn) of greater than or equal to about 0.99, for example, about 1.00 to about 1.25. When the lithium salt and the compound 1A and the compound 2A are mixed to provide the above-described mole ratio, a large amount of unreacted lithium may remain on a surface of a first fired product (e.g., at least one of the first compound and the second compound) produced from the first heat-treatment. Subsequently, the positive active material including the first compound and the second compound according to an embodiment of the present disclosure may be obtained by reacting at least one of the compound 1A and the compound 2A with the unreacted residual lithium during the second heat-treating process.

The compound 1A and the compound 2A may be mixed in a weight ratio of about 90:10 to about 50:50, for example, about 80:20 to about 70:30. When the mixing ratio of the compound 1A and the compound 2A is within the range, a mixture density of the positive active material may be increased, and swelling caused by gas generation under high voltage and high temperature conditions may be suppressed, and the obtained battery may have excellent volumetric capacity.

The lithium salt may include at least one of lithium carbonate, lithium hydroxide, and lithium nitrate.

The rapid temperature-increasing condition (e.g., the first heat-treating) may include a process where a temperature of the mixture is raised from about 25° C. to about 100° C., to a first heat-treating reaction temperature of about 800° C. to about 1000° C., at about 4° C./min to about 6° C./min. When the rapid temperature-increasing (increase) is performed for a short time (e.g., duration), cation mixing may be prevented or decreased, and the first fired product may include a large amount of unreacted residual lithium.

The first heat-treating (process) may be performed under an air atmosphere or an oxidizing gas atmosphere for about 1 hour to about 4 hours. When the first heat-treating is performed for a short time (e.g., duration), cation mixing may be prevented or decreased, and the first fired product may include a large amount of unreacted residual lithium.

As used herein, the term "oxidizing gas atmosphere" refers to a gas atmosphere further including oxygen in air. In some embodiments, the amount of oxygen in the oxidizing gas atmosphere may be about 20 volume % to about 40 volume %.

As the first heat-treating is performed by heating under an air atmosphere or an oxidizing gas atmosphere at a high temperature (800° C. to 1000° C.) for a short time (1 hour to 4 hours), a large amount of unreacted nickel-based transition metal hydroxide (e.g., at least one of compound 1A and compound 2A) may exist. Accordingly, generation of $Ni^{2+}$ may be suppressed, and substitution of $Ni^{2+}$ in Li sites (e.g., cation mixing) may be suppressed or reduced. In addition, a large amount of unreacted residual lithium may be included in (e.g., on) the surface of the nickel-based lithium transition metal oxide (e.g., at least one of the first compound and the second compound).

An insertion height used during the first heat-treating process may be greater than or equal to about 5 cm, for example, about 5 cm to about 8 cm. By performing the heat treatment process while adding the mixture into the heat treatment equipment in a height of greater than or equal to about 5 cm, the production amount may be increased, and production costs may be lowered. In addition, when the amount of unreacted lithium remaining on the surface of the first fired product (e.g., at least one of the first compound and the second compound) is increased, the positive active material may be well formed during the subsequent second heat-treating process.

The first fired product is subjected to a second heat-treatment (process). The second heat-treating process may be performed under conditions including a heat increase rate of about 5° C./min to about 10° C./min from an initial temperature of about 25° C. to about 100° C. to a final temperature of about 700° C. to about 900° C., a maintenance temperature (final maintained temperature) at about 700° C. to about 900° C. for about 3 hours to about 10 hours, and a cooling rate of about 2.5° C./min to about 5° C./min down to about 25° C. to about 100° C.

The second heat-treating process may be performed under an oxygen atmosphere, for example, with an oxygen amount of about 40 volume % to about 100 volume %.

The compound 2A may have a needle-shape, a sheet-shape, or a combination thereof. The second compound obtained using the method of preparing the positive active material may retain the original shape of the compound 2A. When the first compound and the second compound are separately prepared, and then mixed and subjected to the heat treatment to provide a positive active material, the cation mixing amount may be greater than about 3%, or greater than or equal to about 5% even when using a nickel-based transition metal hydroxide precursor $(Ni_{x2}Co_{y2}M^2_{1-x2-y2}(OH)_2)$ having a needle-shape, sheet-shape, or combination thereof.

One or more example embodiments of the present disclosure provide a rechargeable lithium battery including a positive electrode including the positive active material; a negative electrode including a negative active material; and an electrolyte with (between) the positive electrode and the negative electrode.

The positive electrode includes a current collector, and a positive active material layer formed on the current collector and including a positive active material.

In the positive active material layer, a content of the positive active material may be about 90 wt % to about 98 wt % based on a total weight of the positive active material layer. In addition, the positive active material layer may further include a binder and a conductive material. Herein, the amounts of the binder and the conductive material may each independently be about 1 wt % to about 5 wt % based on a total weight of the positive active material layer.

The binder may include polyvinyl alcohol, carboxylmethyl cellulose, hydroxypropyl cellulose, diacetyl cellulose, polyvinyl chloride, polyvinylfluoride, polyvinylpyrrolidone, polyurethane, polytetrafluoroethylene, polyvinylidene fluoride, polyethylene, polypropylene, a styrene-butadiene rubber, an acrylated styrene butadiene rubber, an epoxy resin, nylon, and/or the like, but embodiments of the present disclosure are not limited thereto.

Non-limiting examples of the conductive material include a carbon-based material (such as natural graphite, artificial graphite, carbon black, acetylene black, ketjen black, carbon fiber, and/or the like); a metal-based material of a metal powder and/or a metal fiber including copper, nickel, aluminum, silver, and/or the like; a conductive polymer (such as a polyphenylene derivative); and mixtures thereof.

The current collector may include an aluminum foil, a nickel foil, or a combination thereof, but embodiments of the present disclosure are not limited thereto.

The negative electrode includes a current collector, and a negative active material layer formed on the current collector and including a negative active material.

The negative active material may include a material that reversibly intercalates/deintercalates lithium ions, a lithium metal, a lithium metal alloy, a material capable of doping/dedoping lithium, or a transition metal oxide as described below.

The material that reversibly intercalates/deintercalates lithium ions may include a carbon material. The carbon material may be any suitable carbon-based negative active material used in a rechargeable lithium ion battery. Non-limiting examples thereof include crystalline carbon, amorphous carbon, and mixtures thereof. The crystalline carbon may be non-shaped (e.g., have no particular shape), or may be a sheet, flake, spherical, or fiber shaped natural graphite and/or artificial graphite. The amorphous carbon may be or include a soft carbon, a hard carbon, a mesophase pitch carbonization product, a fired coke, and/or the like.

The lithium metal alloy includes an alloy of lithium and a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may be Si, SiOx (0<x<2), a Si-Q alloy (wherein Q is an element selected from an alkali metal, an alkaline-earth metal, a Group 13 element, a Group 14 element excluding Si, a Group 15 element, a Group 16 element, a transition metal, a rare earth element, and combinations thereof), Sn, $SnO_2$, a Sn—R alloy (wherein R is an element selected from an alkali metal, an alkaline-earth metal, a Group 13 element, a Group 14 element excluding Sn, a Group 15 element, a Group 16 element, a transition metal, a rare earth element, and combinations thereof), and/or the like. At least one of these materials may be mixed with $SiO_2$. The elements Q and R may be selected from Mg, Ca, Sr, Ba, Ra, scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), Zn, cadmium (Cd), boron (B), Al, gallium (Ga), Sn, In, thallium (Tl), Ge, phosphorus (P), arsenic (As), Sb, bismuth (Bi), sulfur (S), selenium (Se), tellurium (Te), polonium (Po), and combinations thereof.

The transition metal oxide may be vanadium oxide, lithium vanadium oxide, and/or lithium titanium oxide.

In the negative active material layer, the negative active material may be included in an amount of about 95 wt % to about 99 wt % based on the total weight of the negative active material layer.

In an embodiment, the negative active material layer includes a binder, and optionally a conductive material. In the negative active material layer, a content of the binder may be about 1 wt % to about 5 wt % based on a total weight of the negative active material layer. When the negative active material layer further includes a conductive material, the negative active material layer may include about 90 wt % to about 98 wt % of the negative active material, about 1 wt % to about 5 wt % of the binder, and about 1 wt % to about 5 wt % of the conductive material.

The binder improves the binding properties of negative active material particles with one another and with a current collector. The binder may include a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, an ethylene propylene copolymer, polystyrene, polyvinylpyrrolidone, polyurethane, polytetrafluoroethylene, polyvinylidene fluoride, polyethylene, polypropylene, polyamideimide, polyimide, and combinations thereof.

The water-soluble binder may be a styrene-butadiene rubber (SBR), an acrylated styrene-butadiene rubber, an acrylonitrile-butadiene rubber, an acrylic rubber, a butyl rubber, a fluorine rubber, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenolic resin, an epoxy resin, polyvinyl alcohol, or any combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. The thickener may be included in an amount of about 0.1 to about 3 parts by weight based on 100 parts by weight of the negative active material.

The conductive material may include a carbon-based material (such as natural graphite, artificial graphite, carbon black, acetylene black, ketjen black, a carbon fiber, and/or the like); a metal-based material of a metal powder or a metal fiber including copper, nickel, aluminum, silver, and/or the like; a conductive polymer (such as a polyphenylene derivative); or any mixture thereof.

The current collector may include at least one selected from a copper foil, a nickel foil, a stainless steel foil, a titanium foil, a nickel foam, a copper foam, a polymer substrate coated with a conductive metal, and combinations thereof.

The electrolyte includes a non-aqueous organic solvent and a lithium salt.

The non-aqueous organic solvent serves as a medium for transmitting ions taking part in the electrochemical reaction of a battery.

The non-aqueous organic solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), methyl acetate, ethyl acetate, n-propyl acetate, t-butyl acetate, methylpropionate, ethylpropionate, decanolide, mevalonolactone, caprolactone, dibutyl ether, tetraglyme, diglyme, dimethoxyethane, 2-methyltetrahydrofuran, tetrahydrofuran, cyclohexanone, ethanol, isopropyl alcohol, nitriles such as R—CN (where R may be a C2 to C20 linear, branched, and/or cyclic hydrocarbon group and R may include a double bond, an aromatic ring, and/or an ether bond), and/or the like, amides (such as dimethyl formamide, and/or the like), dioxolanes (such as 1,3-dioxolane, and/or the like), sulfolanes, and/or the like.

The organic solvent may be used alone or in a mixture. When the organic solvent is used in a mixture, a mixing ratio of the solvents may be controlled or selected in accordance with desired battery performance.

In some embodiments, the organic solvent may further include an aromatic hydrocarbon-based organic solvent. Non-limiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The electrolyte may further include an additive of vinylene carbonate or an ethylene carbonate-based compound as a cycle-life improvement additive.

Non-limiting examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The cycle-life improvement additive may be included at any suitable amount, as understood by those having ordinary skill in the art.

The lithium salt dissolved in an organic solvent supplies a battery with lithium ions, facilitates basic operation of the rechargeable lithium battery, and improves lithium ion transport between a positive electrode and a negative electrode. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example an integer of 1 to 20), LiCl, LiI, and $LiB(C_2O_4)_2$ (lithium bis(oxalato) borate, LiBOB). A concentration of the lithium salt may be about 0.1 M to about 2.0 M. When the lithium salt is included at the above concentration range, an electrolyte may have excellent performance and lithium ion mobility due to optimal or desired electrolyte conductivity and viscosity.

The rechargeable lithium battery may further include a separator between the negative electrode and the positive electrode, depending on the type or form of battery. Non-limiting examples of a suitable separator material include polyethylene, polypropylene, polyvinylidene fluoride, and multi-layers thereof such as a polyethylene/polypropylene double-layered separator, a polyethylene/polypropylene/ polyethylene triple-layered separator, and a polypropylene/ polyethylene/polypropylene triple-layered separator.

FIG. 1 is an exploded perspective view of a rechargeable lithium battery according to an embodiment of the present disclosure. The rechargeable lithium battery is illustrated as a prismatic battery, but is not limited thereto, and embodiments of the present disclosure include variously-shaped batteries such as a cylindrical battery, a pouch battery, and the like.

Referring to FIG. 1, a rechargeable lithium battery 100 according to an embodiment of the present disclosure includes an electrode assembly 40 manufactured by winding a separator 30 interposed between a positive electrode 10 and a negative electrode 20, and a case 50 for housing the electrode assembly 40. An electrolyte may be impregnated in the positive electrode 10, the negative electrode 20, and the separator 30.

Hereinafter, examples of the present disclosure and comparative examples are described. However, the following examples are merely examples, and embodiments of the present disclosure are not limited thereto.

Example 1

A mixture was prepared by mixing lithium carbonate ($Li_2CO_3$) and $Ni_{0.55}Co_{0.25}Mn_{0.20}(OH)_2$ to provide Li:(Ni+Co+Mn) at a mole ratio of 1.01:1.00. Herein, $Ni_{0.55}Co_{0.25}Mn_{0.20}(OH)_2$ was obtained by mixing a compound 1A and a compound 2A having the same composition but different particle diameters at a weight ratio of 8:2.

The mixture was subjected to a first heat-treating under conditions of heating at 5° C./min from 25° C. to 900° C., maintaining at 900° C. for 2 hours, and then cooling at 5° C./min until 25° C. to provide a first fired product including a first compound ($Li_{1.01}Ni_{0.55}Co_{0.25}Mn_{0.20}O_2$) and a second compound ($Li_{1.01}Ni_{0.55}Co_{0.25}Mn_{0.20}O_2$). The first heat-treating process was performed under an air atmosphere in an insertion height of 5 cm.

The first fired product was subjected to a second heat-treating under conditions of heating at 5° C./min from 25° C. to 850° C., maintaining at 850° C. for 10 hours, and then cooling down at 5° C./min until 25° C. to provide a positive active material in which the first compound ($LiNi_{0.55}Co_{0.25}Mn_{0.20}O_2$) and the second compound ($LiNi_{0.55}Co_{0.25}Mn_{0.20}O_2$) are mixed at a weight ratio of 8:2. Meanwhile, the second heat-treating was performed under an oxygen ($O_2$) atmosphere.

In this case, an average particle diameter (D50) of the first compound was 20 μm, an average particle diameter (D50) of the second compound was 3 μm, and an average of the average particle diameters (D50) of the first compound and the second compound was 17 μm. Meanwhile, the second compound had a shape of combining a long needle shape and a sheet shape.

Example 2

A positive active material in which the first compound ($LiNi_{0.55}Co_{0.20}Mn_{0.25}O_2$) and the second compound ($LiNi_{0.55}Co_{0.20}Mn_{0.25}O_2$) are mixed at a weight ratio of 8:2 was prepared in accordance with the same procedure as in Example 1, except that each of the compound 1A and the compound 2A had a composition of $Ni_{0.55}Co_{0.20}Mn_{0.25}(OH)_2$.

In this case, an average particle diameter (D50) of the first compound was 20 μm, an average particle diameter (D50) of the second compound was 3 μm, and an average of average particle diameters (D50) of the first compound and the second compound was 17 µm. Meanwhile, the second compound had a shape of combining a long needle shape and a sheet shape.

Comparative Example 1

A mixture was prepared by mixing lithium carbonate ($Li_2Co_3$) and a compound 1A $Ni_{0.55}Co_{0.25}Mn_{0.20}(OH)_2$ to provide Li:(Ni+Co+Mn) at a mole ratio of 1.03:1.

The mixture was subjected to a heat treatment under conditions of heating at 2.5° C./min from 25° C. to 850° C., maintaining at 850° C. for 20 hours, and then cooling down at 2.5° C./min until 25° C. to provide a first compound ($Li_{1.03}Ni_{0.55}Co_{0.25}Mn_{0.20}O_2$). Meanwhile, the first heat-treating process was performed in an insertion height of 5 cm under an air atmosphere.

Lithium carbonate ($Li_2Co_3$) and the compound 2A ($Ni_{0.55}Co_{0.25}Mn_{0.20}(OH)_2$) having a combination of long needle shapes and sheet shapes were mixed to provide Li:(Ni+Co+Mn) at a mole ratio of 1.00:1, and the mixture was subjected to a heat treatment under conditions of heating at 2.5° C./min from 25° C. to 750° C., maintaining at 750° C. for 15 hours, and then cooling down at 5° C./min until 25° C. to provide a second compound represented by $Li_{1.00}Ni_{0.55}Co_{0.25}Mn_{0.20}O_2$. The process was performed under an air atmosphere.

The first compound and the second compound are mixed at a weight ratio of 8:2, and the mixture was subjected to a third heat treatment under a condition of 400° C. to provide a positive active material including the first compound and the second compound. Herein, the first compound has an average particle diameter (D50) of 20 µm, and the second compound has an average particle diameter (D50) of 3 µm.

Figure 2:
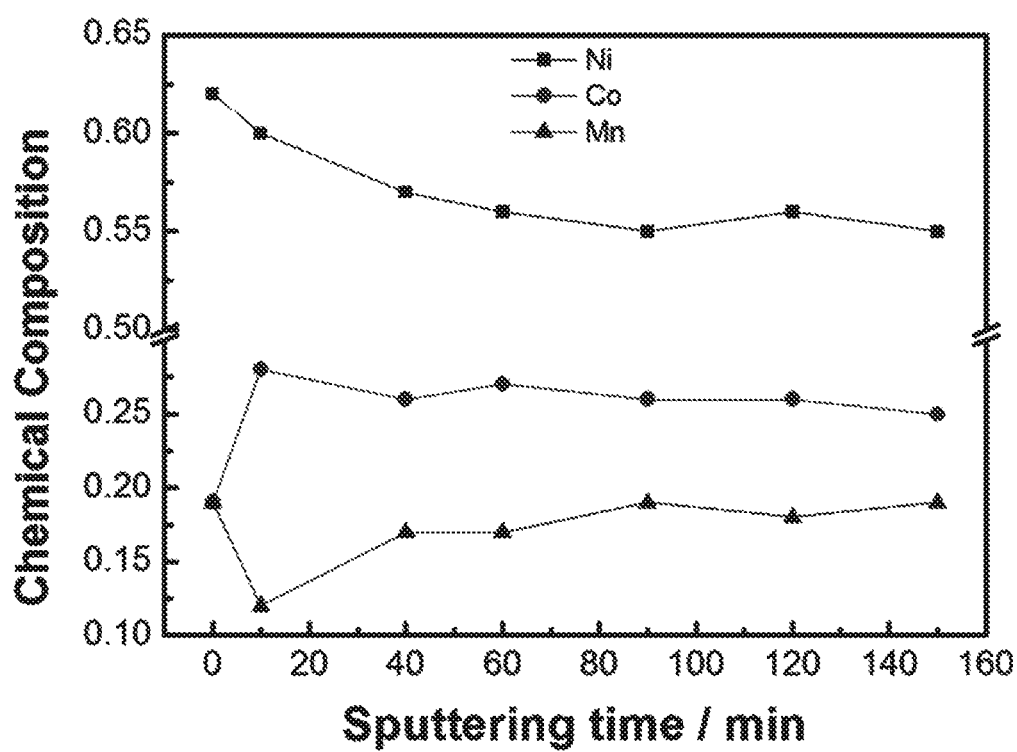
FIG. 2 is a graph showing an X-ray photoelectron spectroscopy (XPS) analysis result of the positive active material prepared in Example 1.
Figure 3:
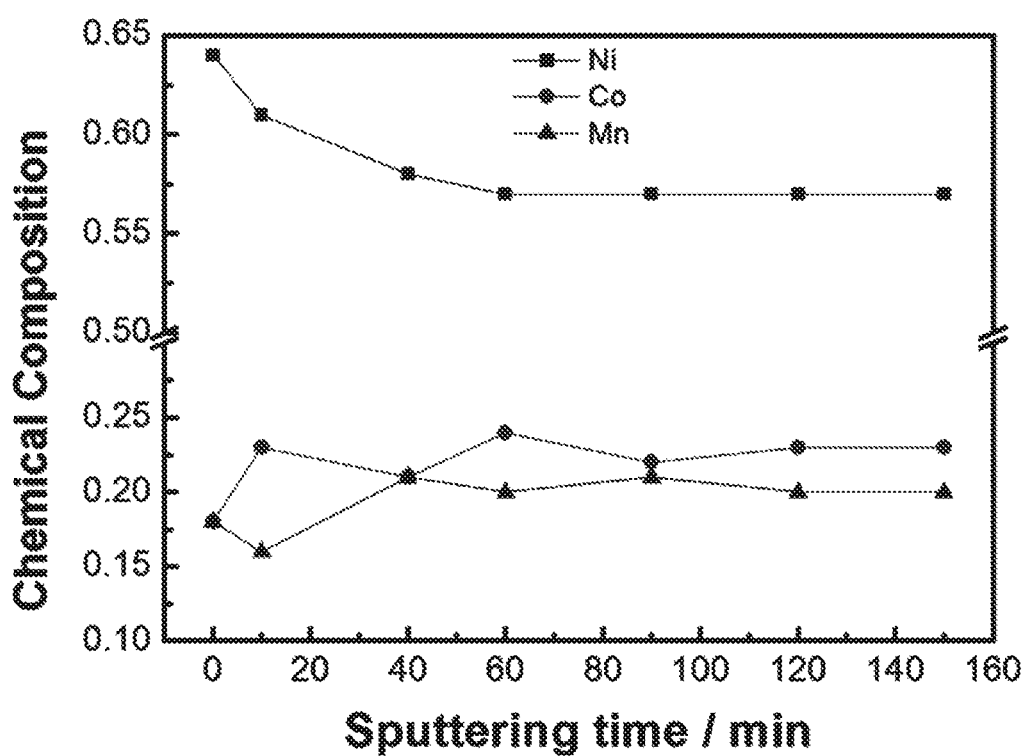
FIG. 3 is a graph showing an XPS analysis result of the positive active material prepared in Example 2.

Evaluation Example 1: Comparison of Ni Atom Concentration of Surface Layer of First Compound and Ni Atom Concentration of Core X-Ray Photoelectron Spectroscopy (XPS) Analysis The first compounds obtained from Examples 1 and 2 and Comparative Example 1 were subjected to a surface sputtering performed with X-ray photoelectron spectroscopy to provide an atom concentration distribution of the first compound. The sputtering uses argon ion at a sputtering rate of 0.5 nm/min ($SiO_2$ conversion). The results of analyzing the average Ni, Co and Mn amounts of the first compound as a whole are shown in Table 1, and the results of analyzing the Ni, Co, and Mn amount depending upon the sputtering time are shown in Tables 2 to 4. In addition, the results of analyzing the Ni, Co, and Mn amounts of the first compounds obtained from Examples 1 and 2 depending upon a sputtering time are shown in FIGS. 2 and 3.

Meanwhile, the atom concentration distribution on a sputtering time of 0 minute to 10 minutes is corresponding to a surface layer (depth of 200 nm from the surface).

TABLE 1

| Ni + Co + Mn = 1 | Ni (at %) | Co (at %) | Mn (at %) |
|---|---|---|---|
| First compound of Example 1 ($Li_{1.01}Ni_{0.55}Co_{0.25}Mn_{0.20}O_2$) | 56 | 25 | 19 |
| First compound of Example 2 ($Li_{1.01}Ni_{0.55}Co_{0.20}Mn_{0.25}O_2$) | 56 | 18 | 26 |
| First compound of | 56 | 26 | 18 |

TABLE 1-continued

| Ni + Co + Mn = 1 | Ni (at %) | Co (at %) | Mn (at %) |
|---|---|---|---|
| Comparative Example 1 ($Li_{1.03}Ni_{0.55}Co_{0.25}Mn_{0.20}O_2$) | | | |

As shown in Table 1, each first compound obtained from Examples 1 and 2 and Comparative Example 1 has all the same Ni atom concentration of 56 at %.

TABLE 2

Example 1: Sputtering results of XPS

| Sputtering time (min) | Ni (unit: at %) | Co (unit: at %) | Mn (unit: at %) |
|---|---|---|---|
| 0 | 62 | 19 | 19 |
| 10 | 60 | 28 | 12 |
| 40 | 57 | 26 | 17 |
| 60 | 56 | 27 | 17 |
| 90 | 55 | 26 | 19 |
| 120 | 56 | 26 | 18 |
| 150 | 55 | 25 | 20 |

TABLE 3

Example 2: Sputtering results of XPS

| Sputtering time (min) | Ni (unit: at %) | Co (unit: at %) | Mn (unit: at %) |
|---|---|---|---|
| 0 | 64 | 18 | 18 |
| 10 | 61 | 23 | 16 |
| 40 | 58 | 21 | 21 |
| 60 | 57 | 24 | 19 |
| 90 | 57 | 22 | 21 |
| 120 | 57 | 23 | 20 |
| 150 | 57 | 23 | 20 |

TABLE 4

Comparative Example 1: Sputtering results of XPS

| Sputtering time (min) | Ni (unit: at %) | Co (unit: at %) | Mn (unit: at %) |
|---|---|---|---|
| 0 | 56 | 26 | 18 |
| 10 | 57 | 27 | 16 |
| 40 | 53 | 26 | 21 |
| 60 | 54 | 26 | 20 |
| 90 | 54 | 25 | 21 |
| 120 | 57 | 23 | 20 |
| 150 | 55 | 25 | 20 |

As shown in Tables 2 and 3 and FIGS. 2 and 3, it was confirmed that the positive active materials obtained from Examples 1 and 2 had surface layer (Tables 2 and 3, sputtering time of less than or equal to 10 minutes) Ni atom concentrations of 60 and 61 Ni at %, respectively, but the positive active material obtained from Comparative Example 1 had a surface layer (Table 4, sputtering time of less than or equal to 10 minutes) Ni atom concentration of less than 58 at %.

For example, referring to Tables 2 to 4, the first compounds obtained from Examples 1 and 2 had a higher Ni atom concentration in the surface layer than in the core, on the other hand, the first compound obtained from Comparative Example 1 had substantially the same Ni atom concentration in the surface layer and the core.

EDS (Energy Dispersive X-Ray Spectroscopy) Analysis

The positive active materials obtained from Examples 1 and 2, and Comparative Example 1 are analyzed by EDS to measure the entire Ni, Co, Mn atom amounts (at %) of the positive active materials. The results are shown in Table 5.

TABLE 5

|  | Ni (at %) | Co (at %) | Mn (at %) |
|---|---|---|---|
| Example 1 | 56.7 | 24.9 | 18.4 |
| Example 2 | 55.4 | 20.2 | 24.4 |
| Comparative Example 1 | 56.6 | 24.8 | 18.6 |

As shown in Table 5, Ni, Co, Mn average atom concentrations of the positive active materials obtained from Examples 1 and 2 are substantially equivalent to the XPS analysis results shown in Table 1.

Evaluation Example 2: Cation Mixing Analysis

The positive active material powders obtained from Examples 1 and 2, and Comparative Example 1 were subjected to a XRD analysis.

The XRD analysis was performed using a diffractomer (Xpert PRO, Philips/Power 3 kW), using CuK-alpha radiation (characteristic X-ray wavelength of 1.541 Å) and the spectra were subjected to Rietveld analysis. The analysis results are shown in Table 6.

TABLE 6

|  | Ni in Li site (%) |
|---|---|
| Example 1 | 2.4 |
| Example 2 | 2.7 |
| Comparative Example 1 | 4.8 |

Referring to Table 6, it was confirmed that cation mixing of the positive active materials obtained from Examples 1 and 2 was less than or equal to 3%, which was improved compared with Comparative Example 1.

Example 3: Manufacture of Test Cell 94 wt % of the positive active material prepared in Example 1, 3 wt % of ketjen black, and 3 wt % of polyvinylidene fluoride were mixed in N-methyl pyrrolidone solvent to prepare a positive active material slurry. The positive active material slurry was coated on an Al foil followed by drying and compressing the same to manufacture a positive electrode. A CR2032 coin-type half-cell was manufactured according to the related art using the positive electrode, a lithium metal counter electrode, and an electrolyte. The electrolyte was a mixed solvent (50:50 volume ratio) of ethylene carbonate and dimethyl carbonate in which 1.0 M $LiPF_6$ was dissolved.

Example 4: Manufacture of Test Cell

A CR2032 coin-type half-cell was manufactured according to the same method as Example 3, except that the positive active material prepared in Example 2 was used.

Comparative Example 2: Manufacture of Test Cell

A CR2032 coin-type half-cell was manufactured according to the same method as Example 3, except that the positive active material prepared in Comparative Example 1 was used.

Evaluation Example 3: Measurement of Initial Charge and Discharge Capacity

The half cells obtained from Examples 3 and 4 and Comparative Example 2 were once charged and discharged at 0.2 C. The charge capacities, discharge capacities, and charge and discharge efficiencies thereof are shown in Table 7.

TABLE 7

|  | Charge capacity (mAh/g) | Discharge capacity (mAh/g) | Charge and discharge efficiency (%) |
|---|---|---|---|
| Example 3 | 186.4 | 177.3 | 95.1 |
| Example 4 | 186.5 | 176.8 | 94.8 |
| Comparative Example 2 | 186.8 | 166.8 | 89.3 |

As shown in Table 7, the half cells obtained from Examples 3 and 4 had improved charge and discharge efficiencies, compared with the half-cell obtained from Comparative Example 2.

Evaluation Example 4: Evaluation of Cycle-Life Characteristics

The half cells obtained from Example 3 and Comparative Example 2 are charged at room temperature under a constant current-constant voltage condition at about 1.0 C (1 C=160 mAh/g) to about 4.3V with a 0.05 C cut-off and discharged under constant current at about 1.0 C to a 3.0V cut-off, which is referred to as 1 cycle, and then repeatedly charged and discharged for about 100 cycles. The discharge capacity at each cycle was measured to provide the capacity retention. The results are shown in FIG. 4.

In addition, the half cells were charged at a high temperature of 45° C. under a constant current-constant voltage condition at 1.0 C (1 C=160 mAh/g) to 4.3 V with a 0.05 C cut-off and discharged under a constant current condition at about 1.0 C, about 3.0V cut-off, which is referred to as 1 cycle, and is repeatedly charged and discharged for a total of 100 cycles to measure a discharge capacity, and then a capacity retention is obtained. The results are shown in FIG. 5.

Figure 4:
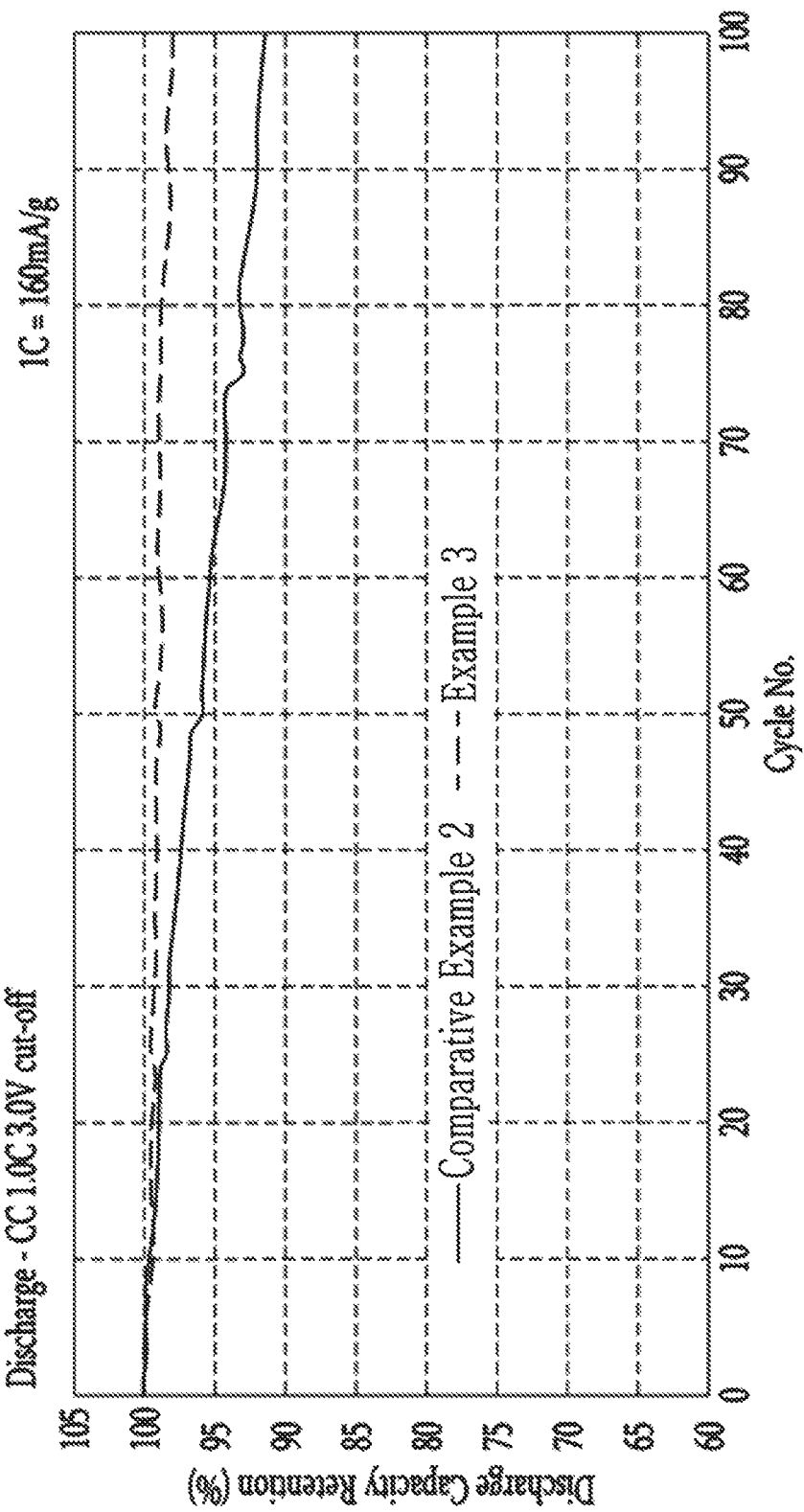
FIG. 4 is a graph showing room temperature cycle-life characteristics of half-cells manufactured in Example 3 and Comparative Example 2.
Figure 5:
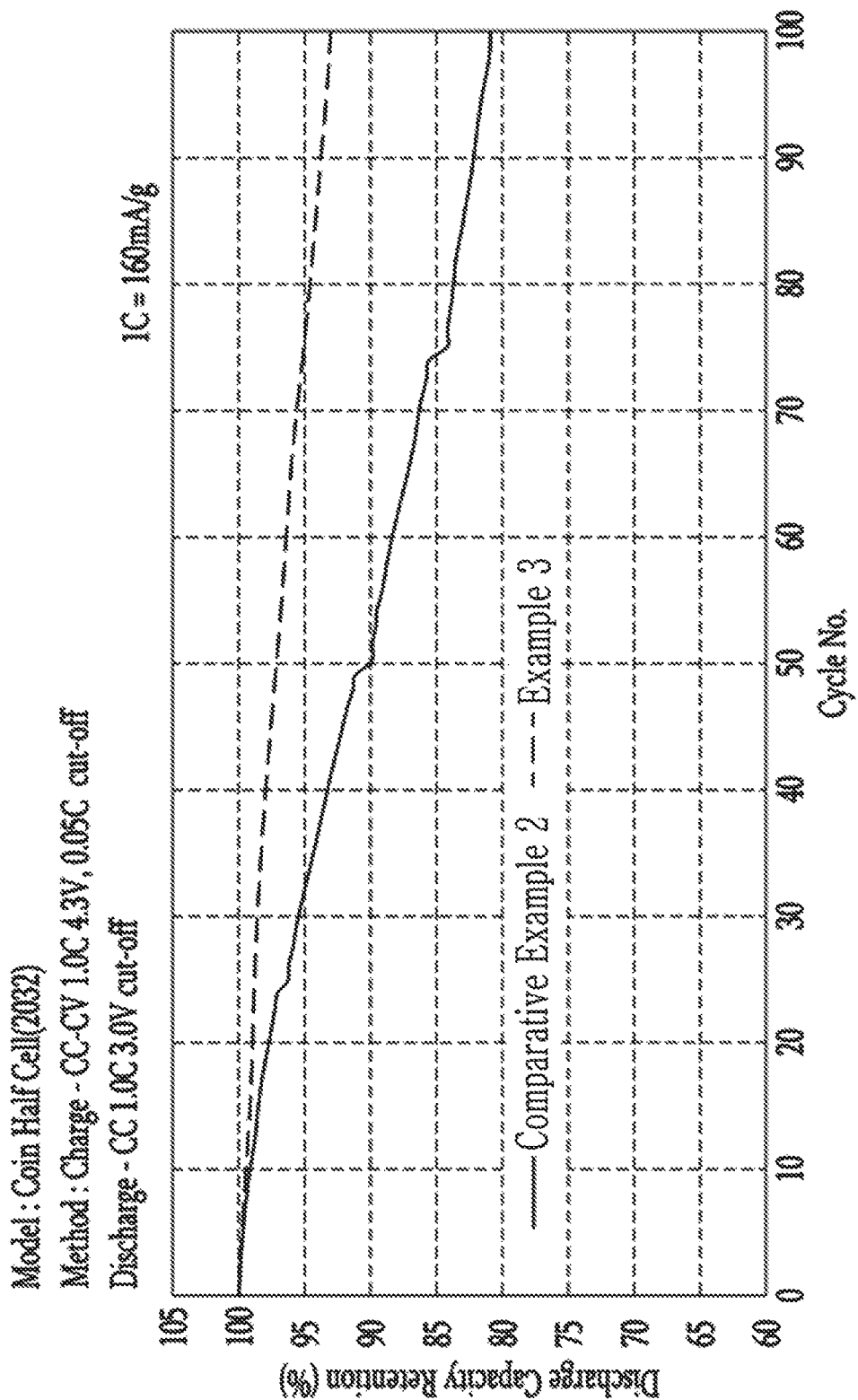
FIG. 5 is a graph showing high temperature cycle-life characteristics of half-cells manufactured in Example 3 and Comparative Example 2.

As shown in FIGS. 4 and 5, the half-cell obtained from Example 3 had improved discharge capacity retention at room temperature and at high temperature, compared with the half-cell according to Comparative Example 3.

As used herein, expressions such as "at least one of", "one of", and "selected from", when preceding a list of elements, modify the entire list of elements and do not modify the individual elements of the list. Further, the use of "may" when describing embodiments of the present disclosure refers to "one or more embodiments of the present disclosure".

In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims and equivalents thereof.

DESCRIPTION OF SOME OF THE SYMBOLS

10: positive electrode
20: negative electrode
30: separator
40: electrode assembly
50: battery case
100: rechargeable lithium battery

What is claimed is:

1. A positive active material for a rechargeable lithium battery, comprising:
a secondary particle of a first compound represented by Chemical Formula 1, and a secondary particle of a second compound represented by Chemical Formula 2 and having a smaller average particle diameter than the secondary particle of the first compound,
at least one selected from the group consisting of the secondary particle of the first compound and the secondary particle of the second compound comprising a core and a surface layer surrounding the core,
an atomic concentration (at %) of nickel (Ni) with respect to a total amount of non-lithium metals in the surface layer being higher than an atomic concentration (at %) of nickel (Ni) with respect to a total amount of non-lithium metals in the core, and
a cation mixing, which is an amount of nickel ion ($Ni^{2+}$) substituted in a lithium ion ($Li^+$) site, being less than or equal to about 3%:

$$Li_{a1}Ni_{x1}Co_{y1}M^1_{1-x1-y1}O_2. \quad \text{Chemical Formula 1}$$

wherein, in Chemical Formula 1, $0.9 \leq a1 \leq 1.05$, $0.3 \leq x1 \leq 0.95$, $0.1 \leq y1 \leq 0.3$, and $M^1$ is at least one metal element selected from Mn, Al, Cr, Fe, V, Mg, Ti, Zr, Nb, Mo, W, Cu, Zn, Ga, In, Sn, La, and Ce, $$Li_{a2}Ni_{x2}Co_{y2}M^2_{1-x2-y2}O_2. \quad \text{Chemical Formula 2}$$

wherein, in Chemical Formula 2, $0.9 \leq a2 \leq 1.05$, $0.3 \leq x2 \leq 0.95$, $0.1 \leq y2 \leq 0.3$, and $M^2$ is at least one metal element selected from Mn, Al, Cr, Fe, V, Mg, Ti, Zr, Nb, Mo, W, Cu, Zn, Ga, In, Sn, La, and Ce.

2. The positive active material of claim 1, wherein the positive active material has an atomic concentration (at %) of nickel (Ni) with respect to the total amount of non-lithium metals of about 30 at % to about 60 at %.

3. The positive active material of claim 1, wherein a ratio of the atomic concentration (at %) of nickel (Ni) with respect to the total amount of non-lithium metals in the surface layer relative to the atomic concentration (at %) of nickel (Ni) with respect to the total amount of non-lithium metals in the core is about 1.03 to about 1.20.

4. The positive active material of claim 1, wherein the secondary particle of the first compound has an average particle diameter (D50) of about 15 μm to about 20 μm.

5. The positive active material of claim 1, wherein the secondary particle of the second compound has an average particle diameter (D50) of about 2 μm to about 5 μm.

6. The positive active material of claim 1, wherein the first compound and the second compound are mixed in a weight ratio of about 90:10 to about 50:50.

7. The positive active material of claim 1, wherein the second compound has a needle-shape, a sheet-shape, or a combination thereof.

8. The positive active material of claim 1, wherein the surface layer is a region corresponding to a depth of about 200 nm from the surface.

9. The positive active material of claim 1, wherein an atomic concentration (at %) of cobalt (Co) in the surface layer is lower than an atomic concentration (at %) of cobalt (Co) in the core.

10. A method of preparing the positive active material of claim 1, the method comprising:
mixing a compound 1A represented by Chemical Formula 1A, a compound 2A represented by Chemical Formula 2A having a smaller particle diameter than the compound 1A, and a lithium salt to prepare a mixture;
first heat-treating the mixture under a rapid temperature-increasing condition to prepare a first fired product comprising residual lithium; and
second heat-treating the first fired product to prepare the positive active material:

$$Ni_{x1}Co_{y1}M^1_{1-x1-y1}(OH)_2. \quad \text{Chemical Formula 1A}$$

wherein, in Chemical Formula 1A, $0.3 \leq x1 \leq 0.95$, $0.1 \leq y1 \leq 0.3$, and $M^1$ is at least one metal element selected from Mn, Al, Cr, Fe, V, Mg, Ti, Zr, Nb, Mo, W, Cu, Zn, Ga, In, Sn, La, and Ce, $$Ni_{x2}Co_{y2}M^2_{1-x2-y2}(OH)_2. \quad \text{Chemical Formula 2A}$$

wherein, in Chemical Formula 2A, $0.3 \leq x2 \leq 0.95$, $0.1 \leq y2 \leq 0.3$, and $M^2$ is at least one metal element selected from Mn, Al, Cr, Fe, V, Mg, Ti, Zr, Nb, Mo, W, Cu, Zn, Ga, In, Sn, La, and Ce.

11. The method of claim 10, wherein the compound 1A and the compound 2A are mixed in a weight ratio of about 90:10 to about 50:50.

12. The method of claim 10, wherein in the mixture, a mole ratio of Li/(Ni+Co+Mn) is greater than or equal to about 0.99.

13. The method of claim 10, wherein the rapid temperature-increasing condition comprises increasing a temperature at about 4° C/min to about 6° C/min.

14. The method of claim 10, wherein the first heat-treating comprises maintaining the mixture in an air atmosphere or an oxidizing gas atmosphere at about 800° C. to about 1000° C. for about 1 hour to about 4 hours.

15. The method of claim 10, wherein the compound 2A has a needle-shape, a sheet-shape, or a combination thereof.

16. A rechargeable lithium battery comprising:
a positive electrode comprising the positive active material of claim 1;
a negative electrode comprising a negative active material; and an electrolyte with the positive electrode and the negative electrode.

\* \* \* \* \*

UNITED STATES PATENT AND TRADEMARK OFFICE
CERTIFICATE OF CORRECTION

| | |
|---|---|
| PATENT NO. | : 11,515,521 B2 |
| APPLICATION NO. | : 16/670739 |
| DATED | : November 29, 2022 |
| INVENTOR(S) | : Mingzi Hong et al. |

Page 1 of 1

It is certified that error appears in the above-identified patent and that said Letters Patent is hereby corrected as shown below:

In the Claims

Column 17, Line 51 (Approx.), Claim 1, Chemical Formula 1

Delete "$Li_{a1}Ni_{x1}Co_{y1}M^{1}_{1-x1-y1}O_2$." and
Insert -- $Li_{a1}Ni_{x1}Co_{y1}M^{1}_{1-x1-y1}O_2$, --

Column 17, Line 56, Claim 1, Chemical Formula 2

Delete "$Li_{a2}Ni_{x2}Co_{y2}M^{2}_{1-x2-y2}O_2$." and
Insert -- $Li_{a2}Ni_{x2}Co_{y2}M^{2}_{1-x2-y2}O_2$, --

Column 18, Line 36 (Approx.), Claim 10, Chemical Formula 1A

Delete "$Ni_{x1}Co_{y1}M^{1}_{1-x1-y1}(OH)_2$." and
Insert -- $Ni_{x1}Co_{y1}M^{1}_{1-x1-y1}(OH)_2$, --

Column 18, Line 43 (Approx.), Claim 10, Chemical Formula 2A

Delete "$Ni_{x2}Co_{y2}M^{2}_{1-x2-y2}(OH)_2$." and
Insert -- $Ni_{x2}Co_{y2}M^{2}_{1-x2-y2}(OH)_2$, --

Signed and Sealed this
Twenty-fifth Day of July, 2023

Katherine Kelly Vidal
*Director of the United States Patent and Trademark Office*